(12) United States Patent
Abdoulin

(10) Patent No.: US 6,577,518 B2
(45) Date of Patent: Jun. 10, 2003

(54) INTEGRATED CONTROLLER FOR SYNCHRONOUS RECTIFIERS

(75) Inventor: Edgar Abdoulin, Woodland Hills, CA (US)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 09/811,697

(22) Filed: Mar. 20, 2001

(65) Prior Publication Data

US 2001/0038546 A1 Nov. 8, 2001

Related U.S. Application Data

(60) Provisional application No. 60/190,915, filed on Mar. 21, 2000.

(51) Int. Cl.[7] .......................... H02M 7/217; H02M 7/04
(52) U.S. Cl. ......................................... 363/127; 363/89
(58) Field of Search ....................... 363/127, 89, 97, 363/131, 21.01, 21.02, 21.04, 21.06, 16, 17

(56) References Cited

U.S. PATENT DOCUMENTS

| | | | | |
|---|---|---|---|---|
| 4,519,024 A | * | 5/1985 | Federico et al. | 363/127 |
| 4,922,404 A | * | 5/1990 | Ludwig et al. | 363/89 |
| 5,179,512 A | * | 1/1993 | Fisher et al. | 363/127 |
| 5,818,704 A | * | 10/1998 | Martinez | 363/21.06 |
| 5,870,299 A | * | 2/1999 | Rozman | 363/127 |
| 5,940,287 A | | 8/1999 | Brkovic | |
| 5,999,420 A | | 12/1999 | Aonuma et al. | |
| 6,026,005 A | | 2/2000 | Abdoulin | |
| 6,239,994 B1 | * | 5/2001 | Abdoulin | 363/89 |

FOREIGN PATENT DOCUMENTS

| | | |
|---|---|---|
| EP | 08 84 829 A1 | 12/1998 |
| GB | 2313495 | 11/1997 |
| JP | 11-308862 | 11/1999 |

OTHER PUBLICATIONS

E. Abdoulin, "Accroitre le rendement du convertisseur synchrone avec un controleur dedie," Electronique, CEP Communication, Paris, France, No. 101, Mar. 2000, pp. 82–84, 86–87, XP000954487.

A. Bindra, "Optimized Synchronous Rectification Drives Up," Electronic Design, Penton Publishing, Cleveland, Ohio, U.S., vol. 48, No. 2, Jan. 24, 2000, pp. 58–59, 62, 64, 66, XP000935405.

E. Abdoulin, "Power Intelligent Geregelt, MOSFET–Losung fur Synchrongleichrichter erhoht Wirkungsgrad von Stromversorgungen," Elektronik, Franzis Verlag GmbH, Munchen, DE, vol. 48, No. 24, Nov. 30, 1999, pp. 78–82, XP000947457.

* cited by examiner

Primary Examiner—Rajnikant B. Patel
(74) Attorney, Agent, or Firm—Ostrolenk, Faber, Gerb & Soffen, LLP

(57) ABSTRACT

An integrated gate drive controller for a synchronous rectifier circuit which minimizes secondary side stray inductance effects in the synchronous transistor branches by controlling overlap of the gate drive signals to the synchronous transistors.

8 Claims, 4 Drawing Sheets

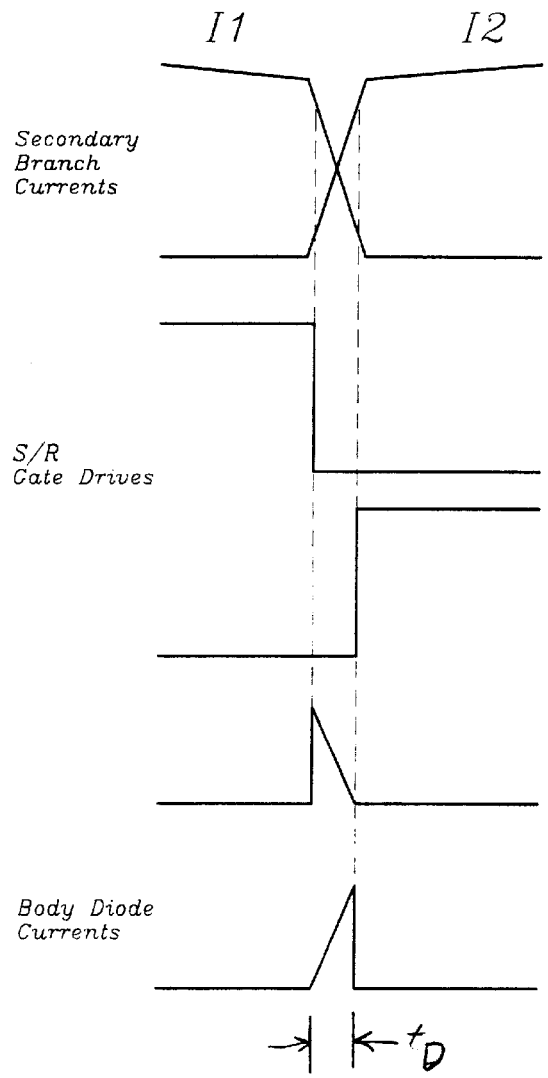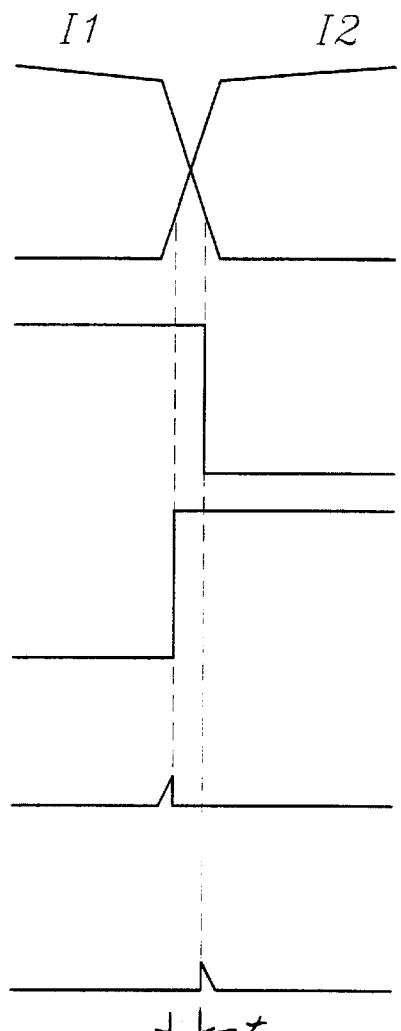
FIG. 2A
FIG. 2B

INTEGRATED CONTROLLER FOR SYNCHRONOUS RECTIFIERS

This application claims the benefit of U.S. Provisional Application Ser. No. 60/190,915, filed Mar. 21, 2000.

BACKGROUND OF THE INVENTION

1. Field of the Invention

The present invention relates to an integrated gate drive controller for synchronous rectifiers. More specifically, the present invention relates to an integrated gate drive controller for synchronous rectifiers that minimizes secondary side stray inductance effects by controlling overlap of the gate drive signals.

2. Brief Description of the Related Art

The use of power MOSFETs as synchronous rectifiers in DC/DC converters with isolated buck topology derivatives is well known. Power MOSFETs result in higher efficiency systems due to lower losses offered by their on-resistance. The recent trends towards lower output voltages and higher currents have made the power MOSFET a highly desirable option for rectification in the secondary side of such converters.

In order for power MOSFETs to operate properly in these topologies, an appropriate gate drive is necessary. By far, the most widely used method for generating the gate drive is the cross-coupled or self-driven scheme. An alternative arrangement is to connect the MOSFET as so-called two terminal switches. These and other known arrangements are shown and described in U.S. Pat. No. 6,026,005, issued to the present inventor and incorporated in its entirety herein by reference.

The power converter disclosed in U.S. Pat. No. 6,026,005 includes a modified PLL with an adjustable delay block in the feedback path that forces the $V_{CO}$ output signal to lead the input signal. One drawback that is not addressed by the power converter of U.S. Pat. No. 6,026,005 is the effect of stray inductances in the secondary side. These stray inductances are disadvantagous in that they maintain a current flow even if the MOSFETs with which they are associated have zero tun-on/off times. This results in MOSFET body diode conduction and unnecessary losses until the current dissipates.

It would be beneficial to provide a controller which minimizes the effects of secondary side stray inductance.

SUMMARY OF THE INVENTION

The present invention overcomes the deficiencies of the prior art, such as those noted above, by providing synchronous rectifier circuit driver that controls dead time/overlap of the rectifier transistor gates.

According to a preferred embodiment, a switching power converter includes a switching transformer having a primary winding and a secondary winding. The secondary winding has first and second voltage nodes across which a winding voltage having a phase and a variable duty cycle is impressed. A first synchronous rectifier transistor is coupled from the first voltage node to a common node, and a second synchronous rectifier transistor is coupled from the second voltage node to the common node. A driver circuit receives the winding voltage and produces first and second drive signals to the first and second synchronous rectifier transistors, respectively. The driver circuit is operable to maintain both transistors on at the same time for a short period, such that induction currents are allowed to dissipate through the transistors rather than the transistor body diode. Accordingly, conduction losses are reduced.

In particular, dead time/overlap control is provided by a pair of NOR latches having inputs and outputs interconnected. As a result, the output gate drives will cross at approximately 50% of Vdd. For a 5 VDC supply, this will translate into 2.5 VDC which constitutes a slight overlap for logic level gate drives with Vth=1.7 Vdc. Addition of resistors and capacitors will reduce the crossover point from ½ Vdd and result in a dead time (no overlap) between the turn-off of one synchronous rectifier device and the turn-on of the other.

In a particularly preferred embodiment, both overlap and dead time of gate drives are used in the same converter circuit at different switching cycles. In topologies using a simple diode to reset the transformer, overlap is used at the transition from the reset cycle to the power transfer cycle. At this transition, the transformer is already reset (Vout(Tx)=0) and there is no danger of causing a cross conduction current. At the power transfer to reset cycle transition, a slight amount of dead time is used to prevent cross conduction. This is required due to the latency of the transformer turn off (due to stray magnetizing inductance, capacitance and/or stray inductance of the transformer). The amount of dead time is primarily dictated by circuit parasitics.

Other features and advantages of the present invention will become apparent from the following description of the invention which refers to the accompanying drawings.

BRIEF DESCRIPTION OF THE DRAWINGS

FIG. 2 is a graph illustrating MOSFET body diode conduction with dead time in gate drives, resulting in high peak body diode currents as shown by the left side graphs, compared to the effects of overlapped gate drives resulting in reduced body diode conduction and reduced losses as shown by the right side graphs.

DETAILED DESCRIPTION OF EMBODIMENTS OF THE INVENTION

Figure 1:
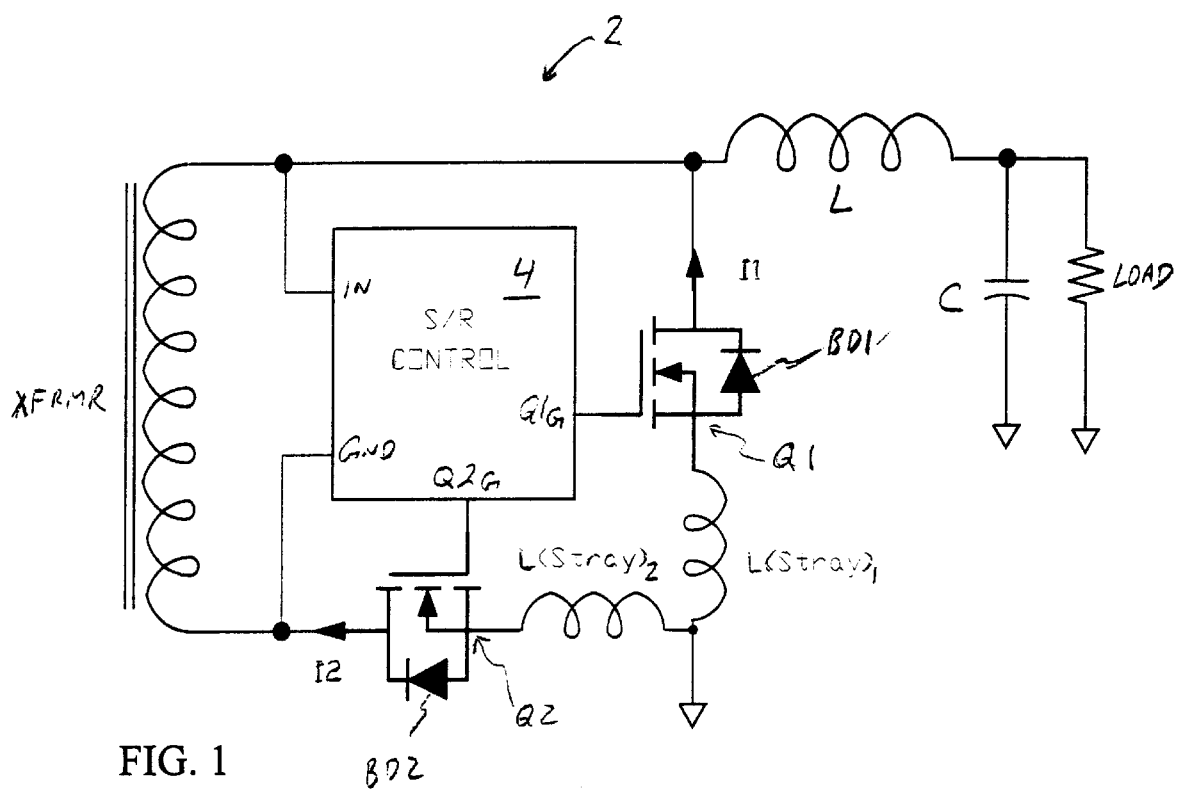
FIG. 1 is a schematic representation of the secondary side of a power converter showing stray inductances.

Referring initially to FIG. 1, a schematic diagram shows a power converter 2 employing the synchronous rectifier controller of the present invention. The converter circuit 2 includes a pair of MOSFET transistors, Q1 and Q2, arranged to switch the voltage at the secondary winding of a transformer, XFRMR. It should be noted that other types of transistors Q1, Q2 may be employed which still fall within the scope of the invention. For example, IGBTs with integral diodes could be used.

The switching of the MOSFETs Q1 and Q2 of converter circuit 2 is controlled by synchronous rectifier control circuit 4 which has IN, GND, Q1$_G$, and Q2$_G$ terminals and is preferably provided in integrated form. Gate driver 4 has an IN terminal connected to the XFRMR winding. Terminals Q1$_G$ and Q2$_G$ provide drive signals to the gates of Q1 and Q2, respectively. Body diodes of transistors Q1 and Q2 are represented by diodes BD1 and BD2, respectively. L(Stray)$_1$ and L(Stray)$_2$ represent stray inductances. Secondary branch currents through transistors Q1 and Q2 are indicated by the arrows labeled I1 and I2, respectively.

Referring to FIGS. 2A and 2B, a pair of graphs is shown illustrating the body diode current in the power converter of FIG. 1. Stray inductances cause secondary branch currents to ramp up or down slowly during transformer transitions. FIG. 2A shows MOSFET body diode conduction with dead time $t_D$ in gate drives results in high peak body diode currents. With dead time between the gate drives, when each device turns off, the stray inductance will force the current through the body diode. Current will ramp down in one branch while ramping up in the other.

In FIG. 2B, the overlapped gate drives show reduced conduction and hence, reduced losses. By maintaining both devices on at the same time for a short period $t_O$ (i.e. overlapped gate drives) the currents are allowed to dissipate through the MOSFET rather than the body diode, thereby reducing losses.

It is important to note that an excessive overlap beyond the requirement to dissipate the currents in the stray inductance will present a short across the transformer, which will result in a loss of efficiency due to unwanted current spikes. Employing proper design practices to minimize secondary stray inductance will reduce the required gate drive overlap and eliminate current spikes in the transformer. Preferred methods of adjusting the gate drive overlap in this regard are discussed further below.

Figure 3:
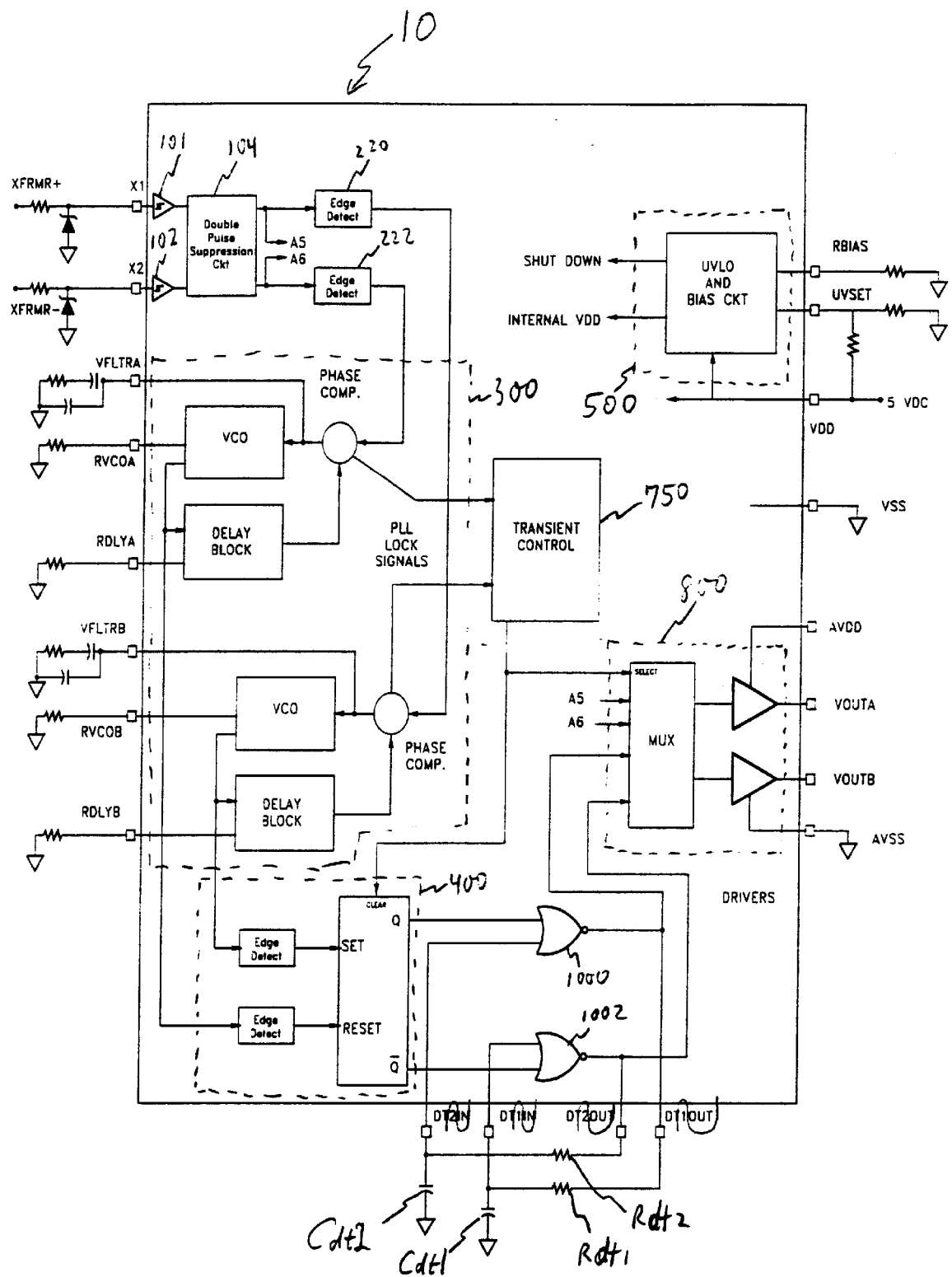
FIG. 3 is a diagram of the integrated synchronous rectifier controller of the present invention.

Referring to FIG. 3, a block diagram for an integrated synchronous rectifier controller 10 is shown. Rectifier controller 10 includes a transformer input X1 for transistor Q1, and a transformer input X2 for transistor Q2. A +5 Vdc supply voltage is connected to pin VDD for powering the internal logic of the controller. VOUTA and VOUTB supply gate signals to transistors Q1 and Q2, respectively. DTIN1 and DTOU1 are used to set the dead time/overlap for the gate output VOUTA to Q1. Similarly, DT1N2 and DTOUT2 are used to set the dead time/overlap for the gate output VOUTB to Q2.

As shown in the block diagram of FIG. 3, controller 10 includes a pair of Schmitt trigger circuits 101 and 102, a double pulse suppression circuit 104, a pair of edge detector circuits 220 and 222, a phase-locked loop circuit 300, and an output regeneration circuit 400. In order to accommodate transitions between operating modes (i.e., the normal mode, off mode, and cross coupled mode), the gate drive circuit 10 also employs an undervoltage lock-out circuit 500, a transient control circuit 750, and multiplexing circuit (or output select circuit) 800.

Dead time/overlap control is provided by NOR latches 1000 and 1002 with DTIN1/DTOUT1 and DTIN2/DTOUT2 inputs and outputs as shown in FIG. 3. In the absence of resistors Rdt1, Rdt2 and capacitors Cdt1, Cdt2 on the inputs and outputs (i.e., DTIN1 connected directly to DTOUT1 and DTIN2 connected directly to DTOUT2) the output gate drives will cross at approximately 50% of Vdd. For a 5 VDC supply, this translates into 2.5 VDC which constitutes a slight overlap for logic level gate drives with Vth=1.7 VDC.

Addition of resistors Rdt1, Rdt2 and capacitors Cdt1, Cdt2 reduces the crossover point from ½ Vdd. Proper selection of values will result in a dead time between the turn-off of one synchronous rectifier device and the turn-on of the other. The dead time/overlap can be calculated according to the following equation:

$$Td(\text{nsec})=0.69*Rdt(\text{KOhms})*Cdt(\text{pF})+5 \text{ (For } Vdd=5 \text{ V)} \quad (1)$$

where Rdt is the resistance between pins DTIN1 and DTOUT1 or DTIN2 and DTOUT2, and Cdt is the capacitance from DTIN1 or DTIN2 to ground. For example, Rdt=10K ohms and Cdt=22 pF will result in Td=156.8 nsec.

Figure 4:
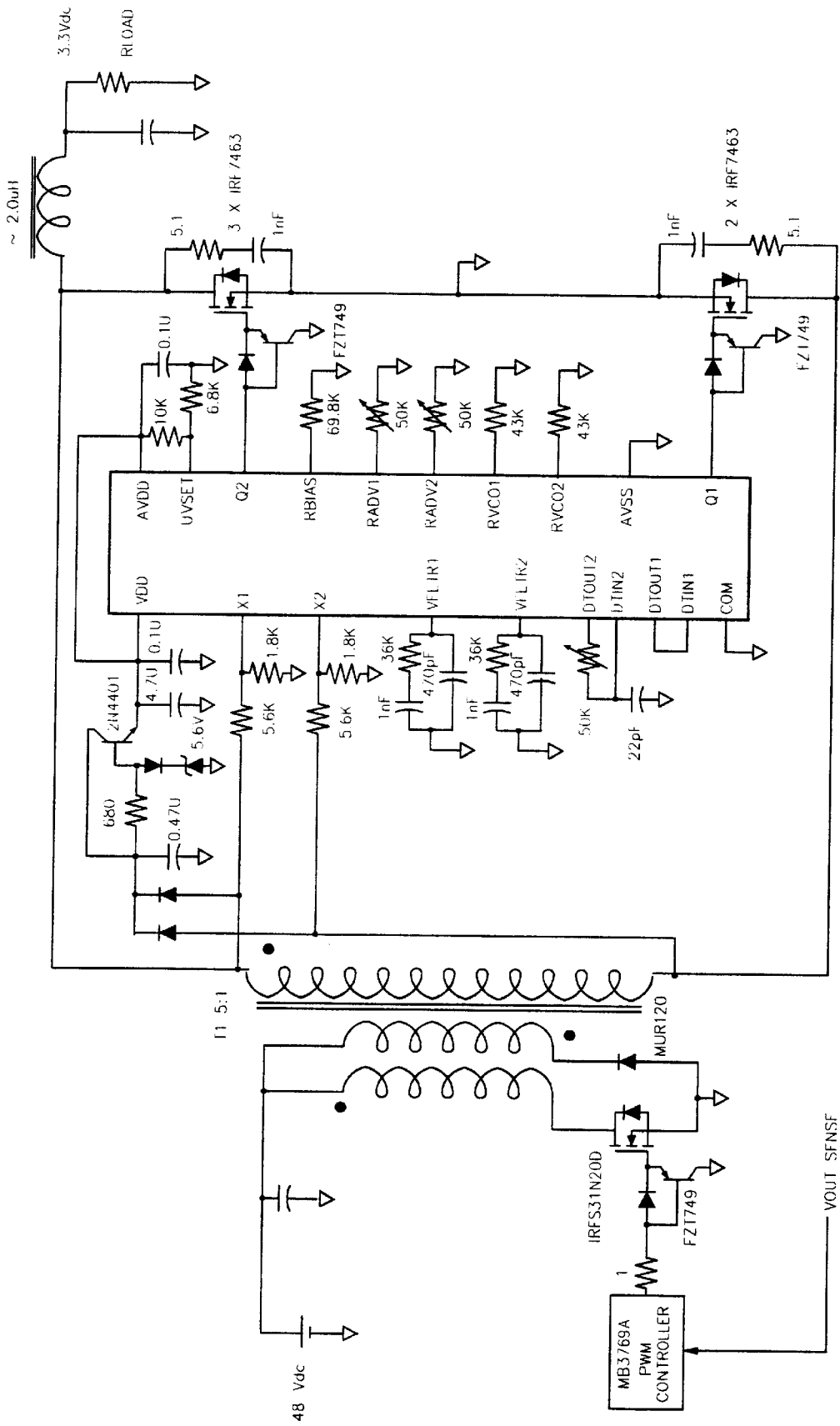
FIG. 4 is a typical connection diagram of the synchronous rectifier controller of the present invention with a single ended forward converter circuit.

Referring to FIG. 4, a typical connection diagram for the gate driver of the present invention is shown. In the connection diagram of FIG. 4, Rdt1=0 and Cdt1=0 (i.e., DTOUT1 and DTIN1 are shorted together), and Rdt2=50K ohms and Cdt2=22 pF, resulting in both overlap and dead time of gate drives in the same converter circuit at different switching cycles.

In topologies using a simple diode to reset the transformer, overlap is used at the transition from the reset cycle to the power transfer cycle. At this transition, the transformer is already reset (Vout(Tx)=0) and there is no danger of causing a cross conduction current. At the power transfer to reset cycle transition a slight amount of dead time is used to prevent cross conduction. This is required due to the latency of the transformer turn off (due to stray magnetizing inductance, capacitance and/or stray inductance of the transformer). The amount of dead time is mainly dictated by circuit parasitics.

Topologies using extended gate drives (e.g., topologies with active reset) will need to employ a slight dead time at both transitions to ensure no cross conduction occurs.

Although the present invention has been described in relation to particular embodiments thereof, many other variations and modifications and other uses will become apparent to those skilled in the art. It is intended, therefore, that the present invention be limited not by the specific disclosure herein, but only by the appended claims.

What is claimed is:

1. A switching power converter, comprising:
   a switching transformer having a primary winding and a secondary winding, the secondary winding having a first and second voltage nodes across which a winding voltage having a phase and a variable duty cycle is impressed;
   a first synchronous rectifier transistor switch coupled from the first voltage node to a common node;
   a second synchronous rectifier transistor coupled from the second voltage node to the common node; and
   a gate driving circuit directly connected to the first and second voltage nodes,
   a gate driver circuit being operable to produce first and second drive signals to the respective gates of the first and second synchronous rectifier transistors based upon the winding voltage, so as to maintain both transistors on at the same time for a short period such that currents through the transistor switches dissipate through the transistors rather than through body diodes of the transistors to thereby reduce conduction losses.

2. The switching power converter of claim 1, wherein said first and second synchronous rectifier transistors comprise power MOSFETs.

3. The switching power converter of claim 1, wherein said first and second synchronous rectifier transistors comprise IGBTs.

4. The switching power converter of claim 1, wherein the amount of overlap during which both transistors are simultaneously on is controllable by external components connected to pins of said gate driver circuit.

5. The switching power converter of claim 4, wherein said external components comprise resistors and capacitors.

6. The switching power converter of claim 4, wherein said external components are selected so as to result in both overlap and dead time of gate drive signals from said gate driver circuit at different switching cycles.

7. The switching power converter of claim 1, wherein the gate driver circuit is an integrated circuit.

8. A switching power converter, comprising:

a switching transformer having a primary winding and a secondary winding, the secondary winding having first and second voltage nodes across which a winding voltage having a phase and a variable duty cycle is impressed;

an output circuit including an inductive element and a capacitive element connected between the the first voltage node and a common node;

a first synchronous rectifier transistor switch coupled from the first voltage node to a common node;

a second synchronous rectifier transistor coupled from the second voltage node to the common node; and a gate driving circuit coupled to the first and second voltage nodes, the gate drive circuit being operable to produce first and second drive signals to the respective gates of the first and second synchronous rectifier transistors based upon the winding voltage, so as to maintain both transistors on at the same time for a short period such that currents through the transistor switches dissipate through the transistors rather than through body diodes of the transistors to thereby reduce conduction losses.

* * * * *